April 27, 1937.  W. A. PRINGLE ET AL  2,078,457
CARBON INDICATOR FOR WRITING MACHINES
Filed May 10, 1935  4 Sheets-Sheet 1
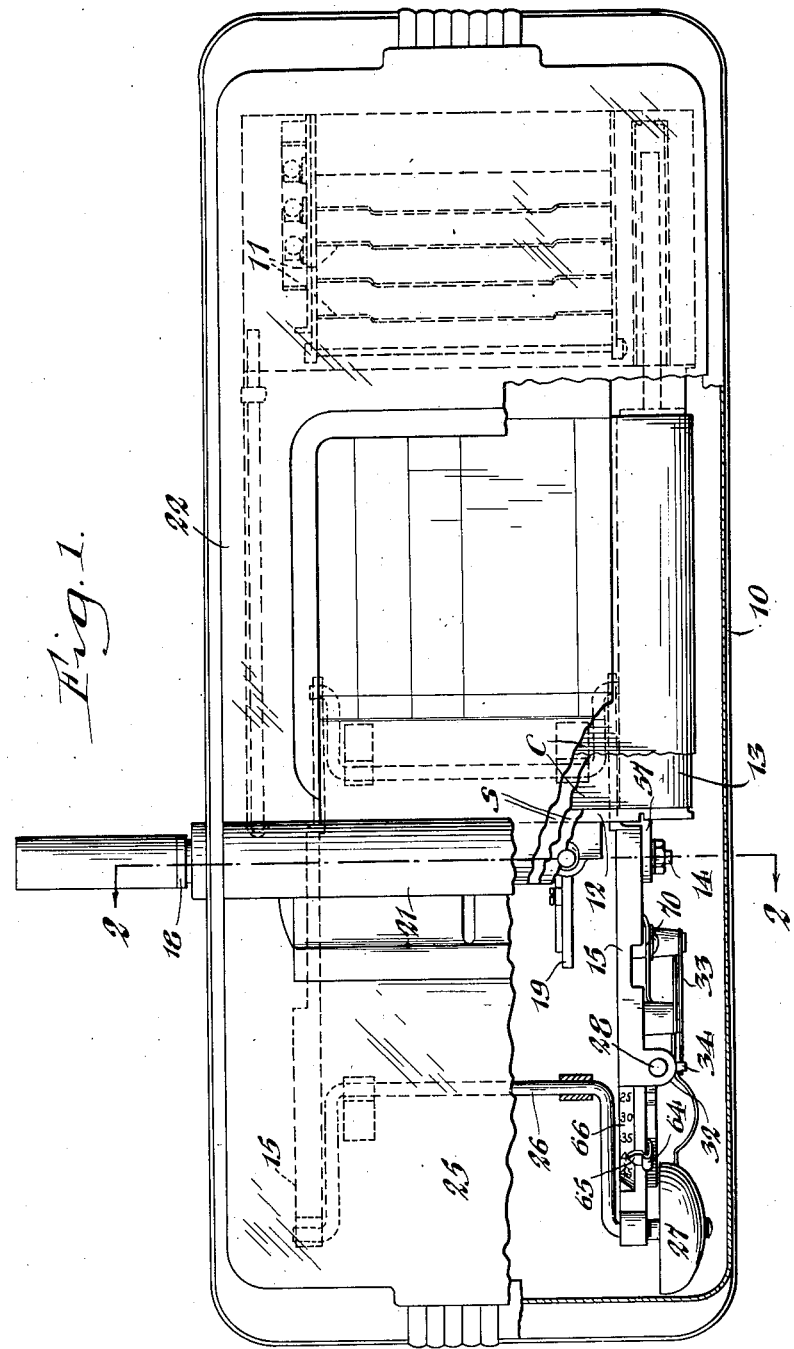

April 27, 1937.  W. A. PRINGLE ET AL  2,078,457
CARBON INDICATOR FOR WRITING MACHINES
Filed May 10, 1935  4 Sheets-Sheet 2

Inventors
W. A. Pringle
C. J. Maurel
by J. W. Anderson
Attorney

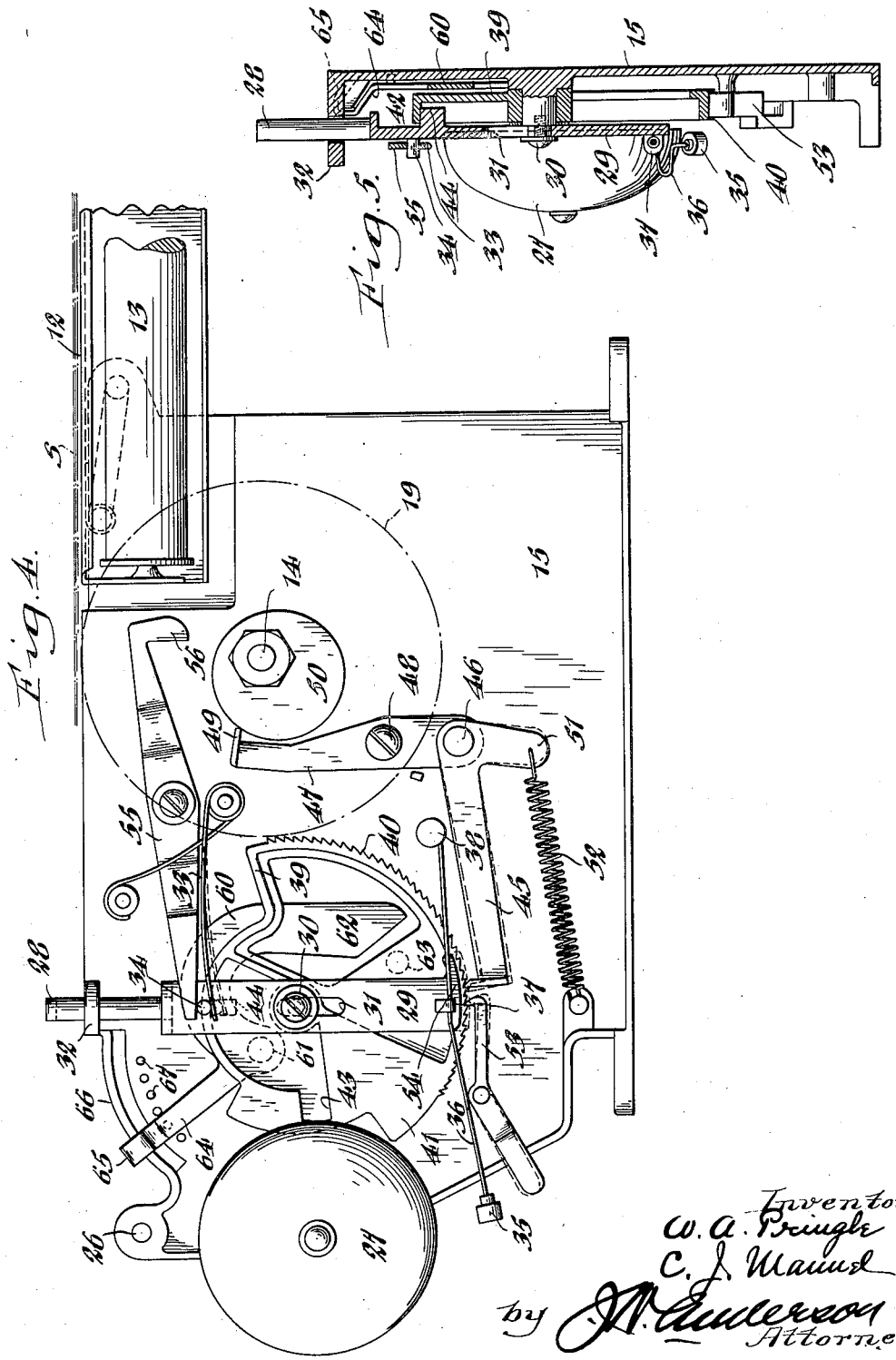

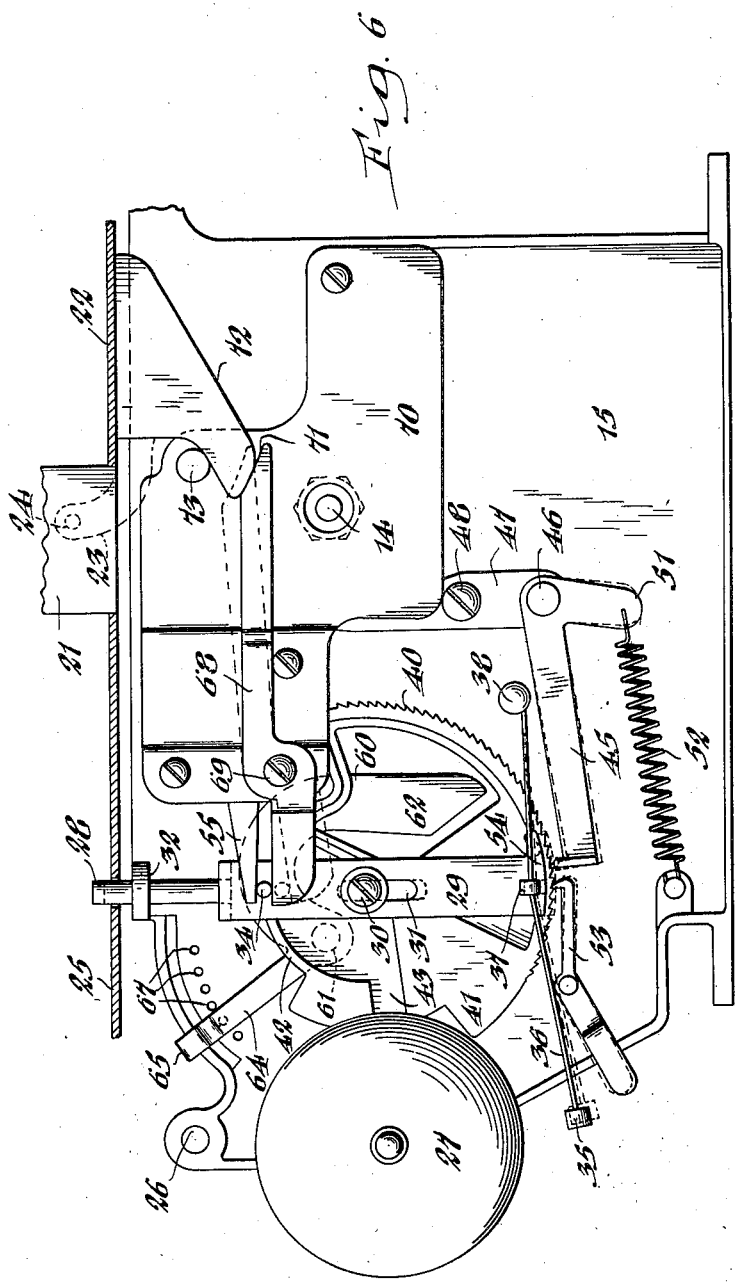

Patented Apr. 27, 1937

2,078,457

UNITED STATES PATENT OFFICE 2,078,457

CARBON INDICATOR FOR WRITING MACHINES

William A. Pringle, Niagara Falls, N. Y., and Charles J. Manuel, Dover, N. H., assignors to American Sales Book Company, Niagara Falls, N. Y., a corporation of Delaware Application May 10, 1935, Serial No. 20,849

25 Claims. (Cl. 282—1)

This invention relates to improvements in record machines, such as writing machines of the autographic register type, and with reference to more particular features thereof, it relates to an improved indicator device for indicating to the operator that the transfer strip or strips used in transferring the inscriptions has become depleted to the extent that change thereof to bring fresh portions into transfer position is desirable.

It is a general object of the invention to provide for machines of the class mentioned an improved indicating device or signal which will inform the operator that it is desirable to insert fresh transfer strips in inscription transfer position.

A further object of the invention is to provide in machines of the class mentioned a carbon use indicating device having an improved arrangement whereby a continuing signal or indication is given at each feed cycle of the record strip feeding mechanism following the use of the transfer strip for transfer inscription for a predetermined number of times.

Still another object of the invention is to provide for machines of the class mentioned a carbon use indicating device having an improved arrangement whereby the indicator cannot be reset or the recurrent signal discontinued until certain parts of the mechanism have been placed in position to permit of the quick and easy shifting of fresh carbon transfer material into inscription transfer position.

A further object of the invention is to provide, in machines of the class mentioned, an improved carbon use indicator which will operate to give a signal only after a predetermined number of feeding cycles of the strip feeding mechanism, but thereafter will function at each subsequent feeding cycle to give an audible signal until parts of the machine controlling the carbon supply have been readjusted.

A further object is to provide an improved resetting gauge for the carbon use indicator whereby the signal indication will be given after varying numbers of feed operating cycles.

Other objects of the invention will be in part pointed out in the following detailed description of an illustrative but preferred embodiment of the invention, and will be in part obvious in connection therewith.

The invention accordingly comprises the features of construction, combinations of elements, and arrangement of parts which will be exemplified in the construction hereinafter set forth, and the scope of the application of which will be indicated in the claims.

For a complete understanding and disclosure of the invention, reference is had to the following detailed description of the illustrative embodiment, and to the accompanying drawings, in which:

Fig. 1 is a plan view of a record or writing machine of the autographic register type embodying the invention, parts being broken away and in section for a clearer disclosure;

Fig. 4 is an enlarged side elevation similar to Fig. 3, parts being removed so as to disclose other parts, and the operative elements being in different positions than in Fig. 3;

Fig. 5 is a detail sectional view taken substantially on the line 5—5 of Fig. 3, looking in the direction indicated by the arrows; and Fig. 6 is a side elevation similar to Fig. 4, but having a more complete assembly of elements, and parts being in section.

In accordance with the illustrative embodiment, this invention is herein disclosed as embodied in a writing machine of the autographic register type similar to that disclosed in the Johnston Patent No. 1,658,127 issued February 7, 1928. It will be understood, however, that the invention is capable of installation in other types of writing machines.

Machines of this type utilize record strips S of the long, continuous traveler type arranged in superposed manifolding relation with each other, being fed forwardly into writing position by a strip feeding mechanism from a strip supply which is usually in the form of a zigzag folded supply pack and is housed in an appropriate compartment in the casing 10 of the machine. The strips are thus fed through a strip tensioning and smoothing mechanism 11 mounted at one end of the casing, and are positioned upon a writing platen 12 upon which they are supported in inscription receiving position. The carbon strip supply 13 is mounted at one edge and beneath the platen from which carbon or transfer strips C extend in interleaved transfer relation with the record strips over the platen.

Figure 2:
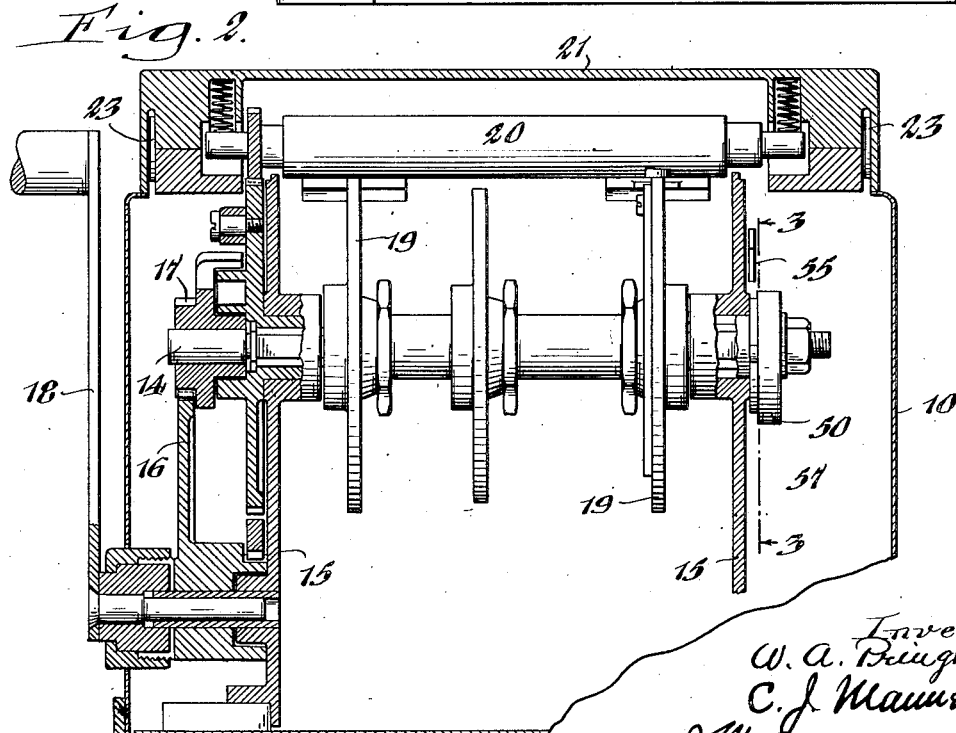
Fig. 2 is an enlarged transverse vertical section taken substantially on the line 2—2 of Fig. 1, looking in the direction of the arrows.

As more particularly shown in Fig. 2 the feeding mechanism may be of the general type disclosed in the Johnston patent mentioned, although for the purposes of this invention it will be understood that other types of feeding mechanism may be employed. In this form, the main feed shaft 14 is rotatably mounted in bearings provided therefor in the frame 15, which is mounted in any suitable manner in the casing 10. This feed shaft is driven by a toothed sector 16 engaging a pinion 17 connected for driving the feed shaft and driven in turn by a crank arm 18. Strip feeding disks 19 are rigidly mounted upon the feed shaft for rotation therewith and are positioned for gripping the record strips against a feed roll 20 rotatably mounted in a feed roll housing or carrier 21. The feed roll housing 21 may be mounted in any preferred manner upon the machine so as to be raised from operative position to carry the feed roll away from feeding contact with the feed disks. Overlying the platen 12 is a cover or margin frame 22 for covering the top of the casing and being provided with an opening over the platen through which inscription entries on the record strips may be made. This cover is movably mounted upon the machine to be raised from its operative position so as to provide access to the record strips and to the carbon supply device 13 underlying the same. Although for purposes of this invention, the cover may be movably mounted in various ways, it is preferred to mount it for pivotal movement by means of mounting arms or extensions 23 extending forwardly from the cover and pivotally attached as at 24 to the roll housing or carrier 21. By means of this mounting the cover may be raised and swung forwardly from its closed position to a position substantially overlying the roll housing. It will be noticed that the cover 22 overlies the carbon supply device 13 and protects the latter from access except when the cover is raised. Therefore, in order to expose the carbon supply for renewal or adjustment, the cover 22 must first be moved into its open position.

At the forward end of the machine beyond the roll housing 21 there is another cover 25 for the casing which may be mounted for opening and closing movements above the underlying compartment by means of a mounting link 26 connected to the under side of the cover and pivoted to the frame 15 of the feed mechanism.

Figure 3:
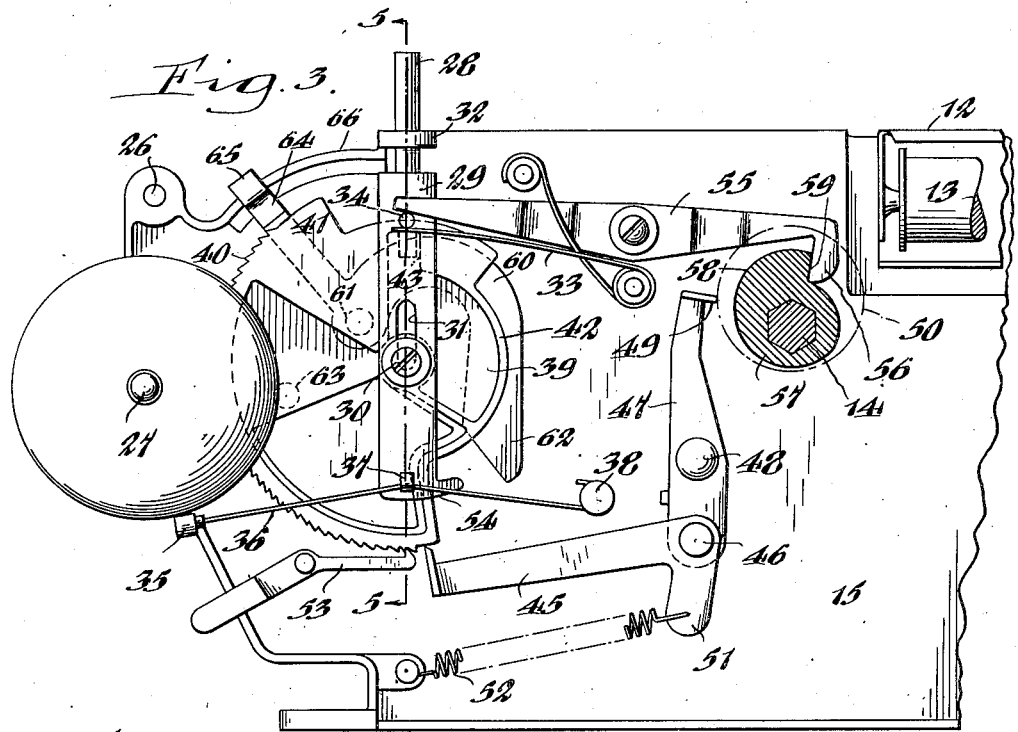
Fig. 3 is an enlarged vertical longitudinal section and elevation, taken substantially on the line 3—3 of Fig. 2, and being viewed in the direction indicated by the arrows.

As shown in Figs. 3, 4 and 6, the carbon use indicator or signal in this illustrative embodiment includes a bell 27 and a visual indicator 28. The bell 27 may be mounted in any appropriate manner, such as by attaching it to the frame 15 where it is housed and protected within the casing 10, while the visual signal 28 is formed by a button or operating extension attached to the operating plunger 29. The visual signal or operating extension 28 preferably extends upwardly through an opening provided therefor in the cover 25 and is preferably conspicuously colored, red for example, so as to be easily discernible by the operator, especially when it is projected upwardly to give an indication as later fully described.

The operating plunger 29 is mounted for vertical reciprocation by means of a screw 30 running in a slot 31 in the plunger and by means of the operating extension 28 which passes through an opening in the bracket 32 attached to the frame 15. The plunger is normally urged into its upward position by means of a tensioned operating spring 33 mounted upon the frame 15 and engaging a pin 34 attached to the plunger. The bell clapper 35 is carried by a spring wire 36 passing through an opening in a bracket 37 attached to the lower end of the plunger 29 and anchored at its end opposite the clapper to a stud 38 on the frame 15. Thus the clapper will be oscillated by vertical oscillation of the plunger 29 so as to sound the bell.

An indicator control element is movably mounted upon the frame 15 for controlling operation of the signal or indicator. While this control element may assume different forms in practice, it is herein disclosed as a rotary element or sector 39 rotatably mounted upon a supporting stud formed on the frame 15 at a point concentric with the screw 30 and positioned directly behind the reciprocating operating plunger 29. This control sector is provided with a toothed rack 40 for operation thereof, and is weighted or overbalanced by providing a thickening or enlargement 41 tending normally to rotate the sector in a counterclockwise direction into its initial or reset condition, as will be clear upon reference to Figs. 4 and 6. At its side opposite to the rack 40 the control sector is formed with an arcuate bar or rib 42 terminating at one end thereof adjacent to a slot or pocket 43 formed in the sector. The rib 42 engages with a lug or pin 44 formed on the rear surface of the operating plunger 29, thus normally holding the plunger in retracted or partially depressed position against the tension of the spring 33.

Cooperating with the ratchet rack 40 for moving the operating sector step by step upon actuation of the strip feeding mechanism is an operating pawl 45 pivoted at 46 to an actuating arm 47 pivotally mounted at 48 to the frame 15. The arm 47 has a follower plate 49 engaging the surface of an eccentric operating cam 50 attached to the main feed shaft 14 for rotation therewith. An arm 51 is connected to the operating pawl 45 extending downwardly from the latter and having connected thereto a spring 52 normally under tension to hold the pawl 45 in operative engagement with the ratchet rack and to hold the follower plate 49 in contact with the operating surface of the cam 50. A holding dog 53 also engages with the teeth of the ratchet rack 40 being pivotally mounted upon the frame 15 and counterweighted to hold it normally in its tooth-engaging or holding position. At its lower extremity the operating plunger 29 is formed with an operating extension 54 having a lower curved surface positioned for engagement with the operating pawl 45 and the holding dog 53, so as to disengage both of these elements from the teeth of the ratchet rack when the plunger is moved downwardly. A signal actuating arm 55 is pivotally mounted intermediate its ends upon the frame 15 engaging at one end with the pin 34 of the operating plunger and at its other end having a follower plate 56 positioned for engagement with an operating cam 57 mounted directly behind the cam 50 and attached to the main feed shaft 14 for rotation therewith. The cam 57 has an eccentric lobe 58 at the extremity of which is a step or depression 59 positioned for cooperation with the follower plate 56 of the operating arm.

For the purpose of stopping the control sector 39 in a definite position when resetting the indicating mechanism, a reset gauge 60 is pivotally mounted at 61 upon the frame 15 having a reset gauge extension 62 positioned for contact engagement with a stop lug 63 projecting from the rear surface of the operating sector. The reset gauge is also provided with an operating arm 64 having an index or pointer 65 running over a graduated scale 66 formed on an appropriately curved surface of the frame 15. A holding device is provided for maintaining the reset gauge in any desired position, such holding device as shown including a projection 66 on the rear face of the arm 64 cooperating with each of a series of depressions or seats 67 formed in the adjacent surface of the frame 15.

Referring more particularly to Fig. 6, an automatically controlled locking device is shown for the purpose of exercising control over the resetting of the indicating mechanism. In the embodiment shown, this locking or holding device is controlled by the cover 22, which in turn protects the carbon supply device from access so that it cannot be reached for adjustment until after the cover has been moved into open position.

This locking device as shown embodies a locking bar 68 pivotally mounted at 69 outside of the frame plate 70, which is attached to the frame 15 and spaced outwardly from the latter a short distance. At its locking end the locking lever 68 is positioned in proximity to the operating plunger 29, underlying the pin 34 so as to hold the plunger against depression except when the locking bar or lever is moved into the dotted line position of Fig. 6. The operating end of the locking lever is formed with a cam surface 71 positioned for engagement with a complementary surface formed on the bracket 72 attached to the under surface of the cover 22. This bracket is also formed to engage a holding lug 73 mounted upon the frame plate 70 for the purpose of holding the cover in its closed position.

The objects and general nature of the invention having been set forth and an illustrative embodiment thereof described in detail, the operation of the invention will now be understood. The machine having been loaded with record strips with which carbon strips are interleaved in transfer relation over the writing platen, inscriptions may be entered and transferred to the different record strips and the strip feeding mechanism operated for a single feeding cycle to feed the record strips forwardly the distance of a single form sheet or form length of the record strips. Ordinarily this feeding cycle is accomplished by a single swing or stroke of the feeding lever 18 or by a single revolution of the feeding crank or handle, as disclosed in the Johnston patent mentioned. This feeding cycle brings the next set of blank forms of the record strips into transfer position over the platen but the carbon strips or sheets which are in transfer position are not disturbed but remain in position to transfer the inscriptions made on the new set of blank forms.

At each feeding cycle of the feed mechanism as described, the operating pawl 45 is oscillated and the control sector 39 thus moved forward one step in a clockwise direction, as viewed in the drawings, the sector being held in its adjusted position by means of the holding dog 53. The control sector is thus moved step by step at each feeding cycle of the feed mechanism. After a predetermined number of operating cycles, the notch or pocket 43 in the control sector comes into alignment with the lug 44 at the back of the operating plunger 29, thus permitting said plunger to be moved upwardly by operation of the spring 33, such upward movement being normally obstructed by engagement of said lug 44 with the rib 42. This upward movement of the plunger carries with it the clapper 35, thus causing the bell to be sounded and causing the indicator 28 to be raised above the surface of the cover 25 and thus conspicuously displayed. This operation of the indicator or signal mechanism gives notice to the operator that the carbon transfer strips have been used for a predetermined number of transfer inscriptions and that they have thus become depleted, requiring adjustment of the carbon strips to bring fresh lengths thereof into inscription transfer position.

If the signal controlling mechanism is not reset after this initial signal indication, the signal will be operated and the bell sounded at each successive feeding cycle of the strip feeding mechanism. This recurrent actuation of the indicating mechanism is brought about in the following manner. At each rotation of the main feed shaft 14, the operating lever 55 is gradually rocked by engagement of the eccentric cam lobe 58 with the follower plate 56, thus gradually depressing the plunger 29 against the stress of the spring 33. When the follower plate 56 comes into alignment with the step or depression 59 the plunger is suddenly released, whereupon it is moved upwardly by the spring 33, causing the bell to be sounded and the signal element 28 to be moved above the surface of the cover plate. The operator is thus apprised at each successive feed cycle that a fresh carbon supply is needed to effect proper transfer inscription. This recurrent actuation of the signal continues in this manner until the mechanism has been reset and resetting cannot take place until after the cover 22 has been raised, thus exposing the transfer strip supply mechanism for convenient adjustment.

Resetting of the signal controlling mechanism after it has reached the stage above described in which the signal is recurrently operated, is brought about by moving the operating plunger 29 downwardly by downward pressure upon the upper end of the signal element 28. This downward movement of the plunger causes the extension 54 to rotate both the operating pawl 45 and the holding dog 53 into position in which they are disengaged from the rack bar 40, whereupon the control sector 39 is reversely rotated by virtue of the counterweight 41 to bring it again into its initial operative position. However, as above mentioned, it is to be observed that the operating plunger 29 cannot be thus depressed to reset the signal controlling mechanism until after the cover 22 has been raised. Such raising of the cover causes the cam surface of the bracket 72 to move away from the cam surface 71 of the locking bar 68, thus permitting the latter to swing on its pivotal mounting to the dotted line position in Fig. 6, thus releasing the plunger to downward movement sufficient to release the pawl 45 and holding dog 53. The recurrent signal actuation is thus under control of the cover 22, which in turn protects the carbon supply device, rendering said device impossible of adjustment until after the cover has been raised. When the cover has been raised to release the resetting device, the adjustment of fresh carbon into inscribing position is an easy matter.

When it is desired to actuate the signal to indicate a greater or smaller number of uses of the carbon, adjustment of the reset gauge 60 is easily accomplished for this purpose. Swinging of the arm 64 to the right in Figs. 3, 4, and 6 moves the stop extension 62 to engage the stop lug 63 on the control sector, thus stopping the resetting rotation of said sector earlier, whereas movement of the arm 64 to the left will stop the resetting rotation later. Consequently, if it is desired to initiate the signal indication after a smaller number of feed cycles, the arm 64 will be swung to the right, and if it is desired to initiate signal actuation after a larger number of feed cycles, the arm 64 will be swung to the left. The scale 66 is preferably provided with numbers to indicate approximately the number of times that the carbon sheets have been used prior to the first indicator actuation.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described our invention, what we claim as new and desire to secure by Letters Patent is:

1. In a record machine, in combination, strip feeding mechanism, a signal, signal operating means controlled by said feeding mechanism for operating said signal to give an indication only after a predetermined number of strip feeding cycles of said feeding mechanism, means including a resetting actuator for resetting said signal operating means into position in which signal indication is not given by operation of the feeding mechanism, and independently manually operated means for locking said resetting actuator against resetting operation.

2. In a record machine, in combination, strip feeding mechanism, a signal, signal operating means controlled by said feeding mechanism for operating said signal to give an indication only after a predetermined number of strip feeding cycles of said feeding mechanism, means including a resetting actuator for resetting said signal operating means into position in which signal indication is not given by operation of the feeding mechanism, a transfer strip supply device, protecting means normally maintaining said supply device from strip adjusting action, and a locking device automatically controlled by said protecting means for locking said resetting actuator against resetting operation.

3. In a record machine, in combination, strip feeding mechanism, a signal, signal operating means controlled by said feeding mechanism for operating said signal to give an indication only after a predetermined number of strip feeding cycles of said feeding mechanism, a resetting device for resetting said signal operating means into position in which signal indication is not given by operation of the feeding mechanism, a transfer strip supporting device, protecting means normally protecting said supply device from strip adjusting access, a locking device for locking said resetting device against resetting operation, and an operating connection between said protecting means and said lock device whereby movement of said protecting means into position to permit adjusting access to said strip supply device releases said locking device.

4. In a record machine, in combination, strip feeding mechanism, a signal, signal operating means controlled by said feeding mechanism for operating said signal to give an indication only after a predetermined number of strip feeding cycles of said feeding mechanism, means for resetting said signal operating means into position in which signal indication is not given by operation of the feeding mechanism, a transfer strip supporting device, a movably mounted cover normally covering said supply device, a locking bar for said resetting device, and operating connections between said cover and said locking bar for locking and releasing said resetting device.

5. In a record machine, in combination, strip feeding mechanism, a carbon use indicator connected for operative control by said feeding mechanism for operation only after a predetermined number of strip feeding cycles of the feeding mechanism, and means for giving a recurrent indication by said indicator at each subsequent feeding cycle of the feeding means.

6. In a record machine, in combination, strip feeding mechanism, a carbon use indicator connected for operative control by said feeding mechanism for operation only after a predetermined number of strip feeding cycles of the feeding mechanism, means for giving a recurrent indication by said indicator at each subsequent feeding cycle of the feeding means, means for resetting said indicator operating means into position in which the indicator is not operated by operation of the feeding mechanism, and independently manually operated means for locking said resetting means against resetting operation.

7. In a record machine, in combination, strip feeding mechanism, a carbon use indicator connected for operative control by said feeding mechanism for operation only after a predetermined number of strip feeding cycles of the feeding mechanism, means for giving a recurrent indication by said indicator at each subsequent feeding cycle of the feeding means, a transfer strip supply device, protecting means normally protecting said supply device from strip adjustment, and a locking device automatically controlled by said protecting means for locking said resetting device against resetting operation.

8. In a record machine, in combination, strip feeding mechanism, a carbon use indicator connected for operative control by said feeding mechanism for operation only after a predetermined number of strip feeding cycles of the feeding mechanism, means for giving a recurrent indication by said indicator at each subsequent feeding cycle of the feeding means, a transfer strip supply device, a movably mounted cover for said supply device, and means controlled by movement of said cover for terminating the recurrent indication of said indicator.

9. In a record machine, in combination, strip feeding mechanism, a signal controlled by operation of said feeding mechanism, a transfer strip supply device, means for protecting said supply device against adjustment, and means operatively connected to said protecting means for controlling the operation of said signal.

10. In a record machine, in combination, strip feeding mechanism, a signal, signal operating means operatively connected to said feeding mechanism for operating said signal, a signal controlled device normally restraining signal operation and driven by the feeding mechanism to permit signal operation so as to give an indication only after a predetermined number of strip feeding cycles of said feeding mechanism, means for resetting said signal control device into position in which signal indication is not given by operation of the feeding mechanism, and a reset gauge for controlling the resetting of said signal control device to vary said predetermined number of feed cycles before signal operation.

11. In a record machine, in combination, strip feeding mechanism, a signal, signal operating means operatively connected to said feeding mechanism for operating said signal, a signal controlled device normally restraining signal operation and driven by the feeding mechanism to permit signal operation so as to give an indication only after a predetermined number of strip feeding cycles of said feeding mechanism, means for resetting said signal control device into position in which signal indication is not given by operation of the feeding mechanism, a transfer strip supply device, protecting means normally protecting said supply device from strip adjusting access, a locking device connected for operation by said protecting means for locking said resetting actuator against resetting operation, and a reset gauge for controlling the resetting of said signal control device to vary said predetermined number of feed cycles before signal operation.

12. In a record machine, in combination, strip feeding mechanism, a signal, signal operating means controlled by said feeding mechanism for operating said signal to give an indication only after a predetermined number of strip feeding cycles of said feeding mechanism, means for resetting said signal operating means into position in which signal indication is not given by operation of the feeding mechanism, a transfer strip supply device, a movably mounted cover normally covering said supply device, a locking bar for said resetting device, operating connections between said cover and said locking bar for locking and releasing said resetting device, and a reset gauge for controlling the resetting of said signal operating means to vary said predetermined number of feed cycles before signal operation.

13. In a record machine, in combination, strip feeding mechanism, a carbon use indicator connected for operative control by said feeding mechanism for operation only after a predetermined number of strip feeding cycles of the feeding mechanism, means for giving a recurrent indication by said indicator at each subsequent feeding cycle of the feeding means, and a reset gauge for controlling the resetting of said indicator operating means to vary said predetermined number of feeding cycles before indicator operation.

14. In a record machine, in combination, strip feeding mechanism, a carbon use indicator, means operated by said feeding mechanism for actuating said indicator only after a predetermined number of feed cycles of said feeding mechanism, and means whereby said indicator is subsequently actuated recurrently at each feeding cycle.

15. In a record machine, in combination, strip feeding mechanism, a carbon use indicator, means operated by said feeding mechanism for actuating said indicator only after a predetermined number of feed cycles of said feeding mechanism, means whereby said indicator is subsequently actuated recurrently at each feeding cycle, a carbon supply device with protective means for normally maintaining it against adjustment of the carbon strip, means for discontinuing the recurrent actuation of said indicator, holding means preventing actuation of said last mentioned means, and means actuated by operation of said protective means to permit carbon strip adjustment, for releasing said holding means.

16. In a record machine, in combination, strip feeding mechanism, a carbon use indicator, means operated by said feeding mechanism for actuating said indicator only after a predetermined number of feed cycles of said feeding mechanism, means whereby said indicator is subsequently actuated recurrently at each feeding cycle, means for resetting the indicator operating means, and a reset gauge for controlling the resetting of said resetting means to vary said predetermined number of feeding cycles before indicator operation.

17. In a record machine, in combination, strip feeding mechanism, a carbon use indicator, means operated by said feeding mechanism for actuating said indicator, and an indicator control device separate from said indicator actuating means and separately operated by said feeding mechanism to prevent indicator actuation except under predetermined conditions.

18. In a record machine, in combination, strip feeding mechanism, a carbon use indicator, means operated by said feeding mechanism for actuating said indicator, a movably mounted indicator control device having a ratchet rack and cooperating with said indicator actuating means to prevent indicator actuation in certain positions of the control device, and a pawl operated by said feeding mechanism and engaging said rack to move said control device into indicator releasing position upon a predetermined number of feed cycles.

19. In a record machine, in combination, strip feeding mechanism, a carbon use indicator, a reciprocating member actuated by said feed mechanism and connected for actuating said indicator, a rotary indicator control device cooperating in certain positions thereof with said reciprocating member to prevent indicator actuation, and operating means operated by said feeding mechanism for moving said control device to release said plunger to permit indicator actuation thereby upon a predetermined number of feed cycles.

20. In a record machine, in combination, strip feeding mechanism, a carbon use indicator, means operatively connected to said feeding mechanism for actuating said indicator, a control device for said indicator actuating means to prevent indicator actuation, means operated by said feeding mechanism for setting said control device to permit indicator actuation, and means whereby said indicator actuating means actuates said indicator at each operative cycle of said feeding mechanism after setting of said control device.

21. In a record machine, in combination, strip feeding mechanism, a carbon use indicator, means operatively connected to said feeding mechanism for actuating said indicator, a holding device normally preventing actuation of said indicator by operation of said actuating means, and means operatively connected to said feeding mechanism for setting said holding device in position to free said actuating means to effect actuation of said indicator thereby.

22. In a record machine, in combination, strip feeding mechanism, a carbon use indicator, means operatively connected to said feeding mechanism for actuating said indicator, a holding device normally preventing actuation of said indicator by said actuating means, means operatively connected to said feeding mechanism for setting said holding device in position to free said actuating means to effect actuation of said indicator thereby, and means whereby said actuating means thereafter effects recurrent actuation of said indicator at the successive operative cycles of said feeding mechanism.

23. In a record machine, in combination, strip feeding mechanism, a carbon use indicator, means operatively connected to said feeding mechanism for actuating said indicator, a holding device including a rotary member having a holding rib cooperating with said actuating means to prevent actuation of the said indicator thereby, and means operatively connected to said feeding mechanism for rotating said rotary member to move said holding rib into position for releasing said actuating means to provide for actuation of said indicator by the feeding mechanism.

24. In a record machine, in combination, strip feeding mechanism, a carbon use indicator, means operatively connected to said feeding mechanism for actuating said indicator, a holding device including a movably mounted control member cooperating in certain positions thereof with said actuating means to prevent actuation of said indicator and to release the actuating means in another position of said control member, means operatively connected to said feeding mechanism for moving said control member from its initial holding position into its releasing position only by a plurality of feeding cycles of the feeding mechanism, means for holding said control member in its releasing position, and means for resetting said control member into its initial position.

25. In a record machine, in combination, strip feeding mechanism, a carbon use indicator, means operatively connected to said feeding mechanism for actuating said indicator, a holding device including a movably mounted control member cooperating in certain positions thereof with said actuating means to prevent actuation of said indicator and to release the actuating means in another position of said control member, means operatively connected to said feeding mechanism for moving said control member from its initial holding position into its releasing position only by a plurality of feeding cycles of the feeding mechanism, means for holding said control member in its releasing position, and means whereby said actuating means thereafter effects recurrent actuation of said indicator when the feeding mechanism is actuated.

WILLIAM A. PRINGLE.
CHARLES J. MANUEL.